Patented Nov. 10, 1953

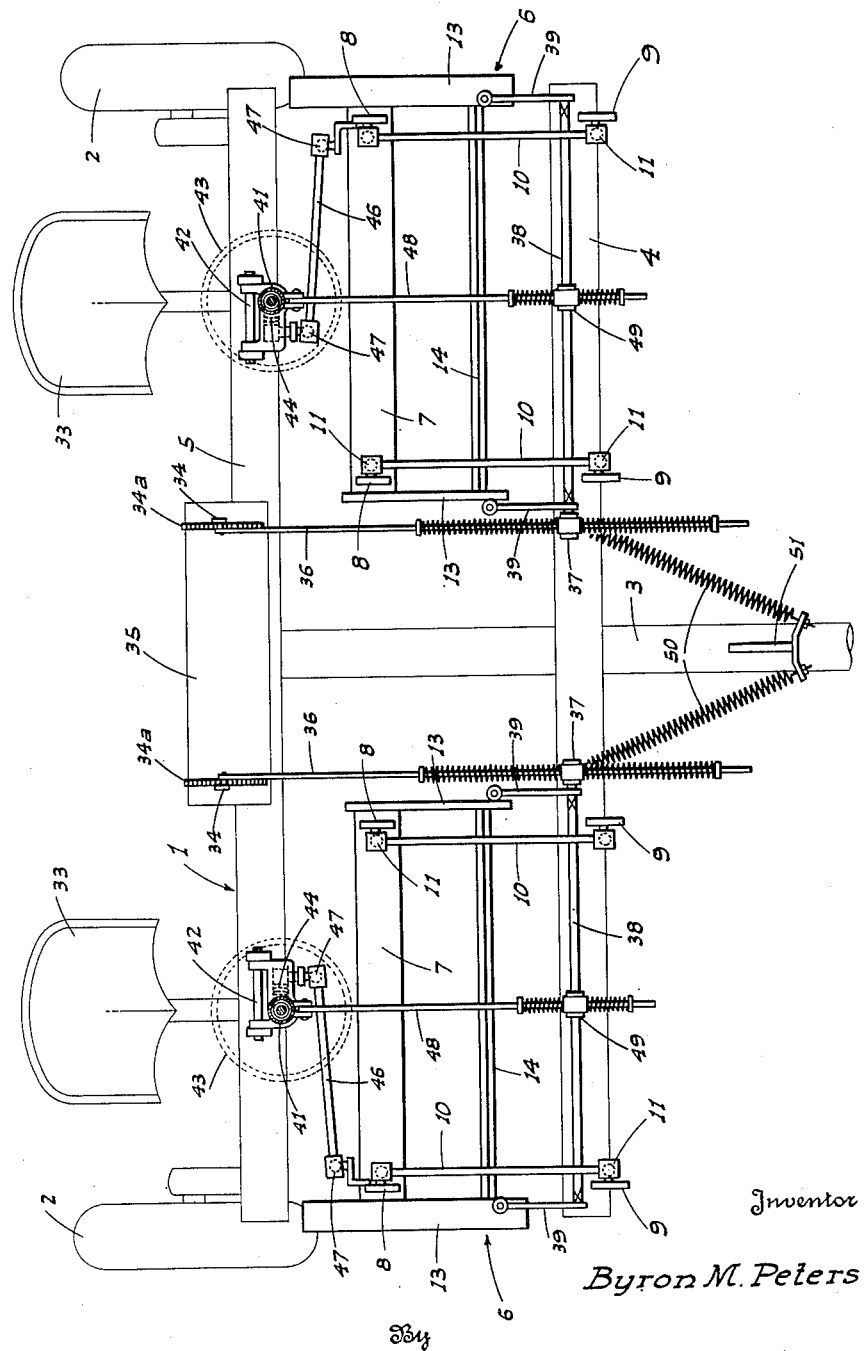

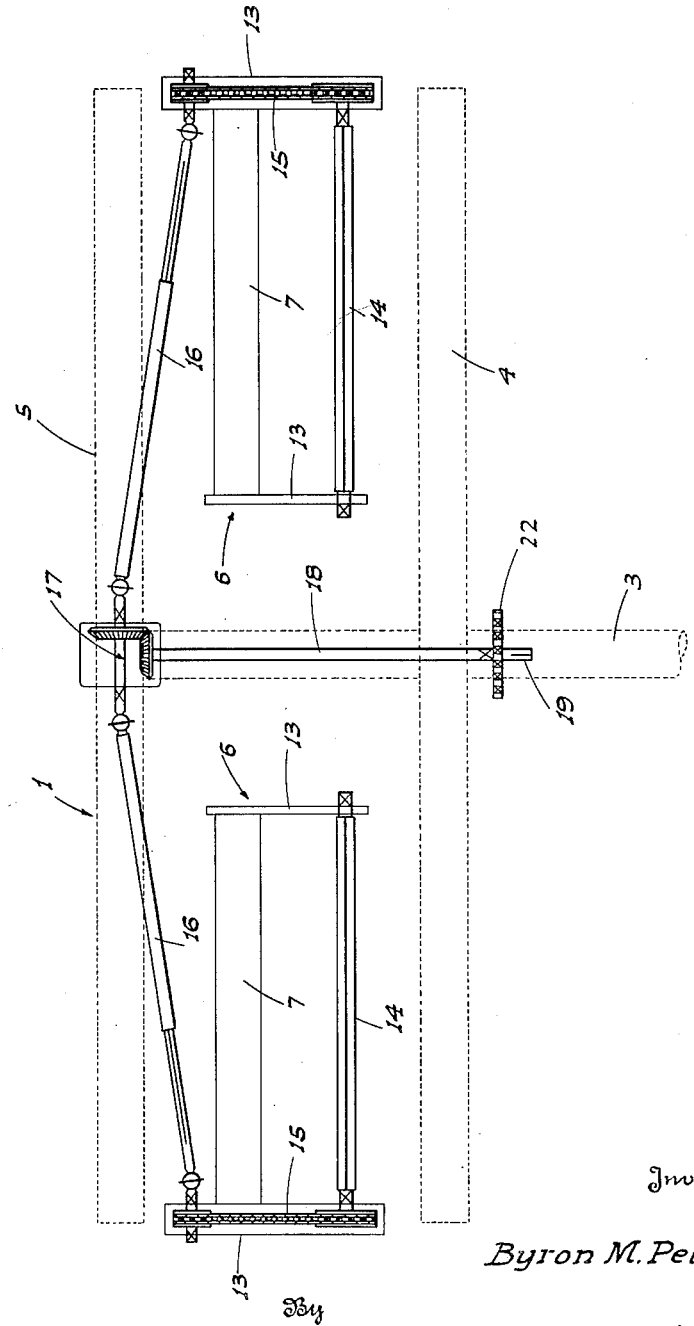

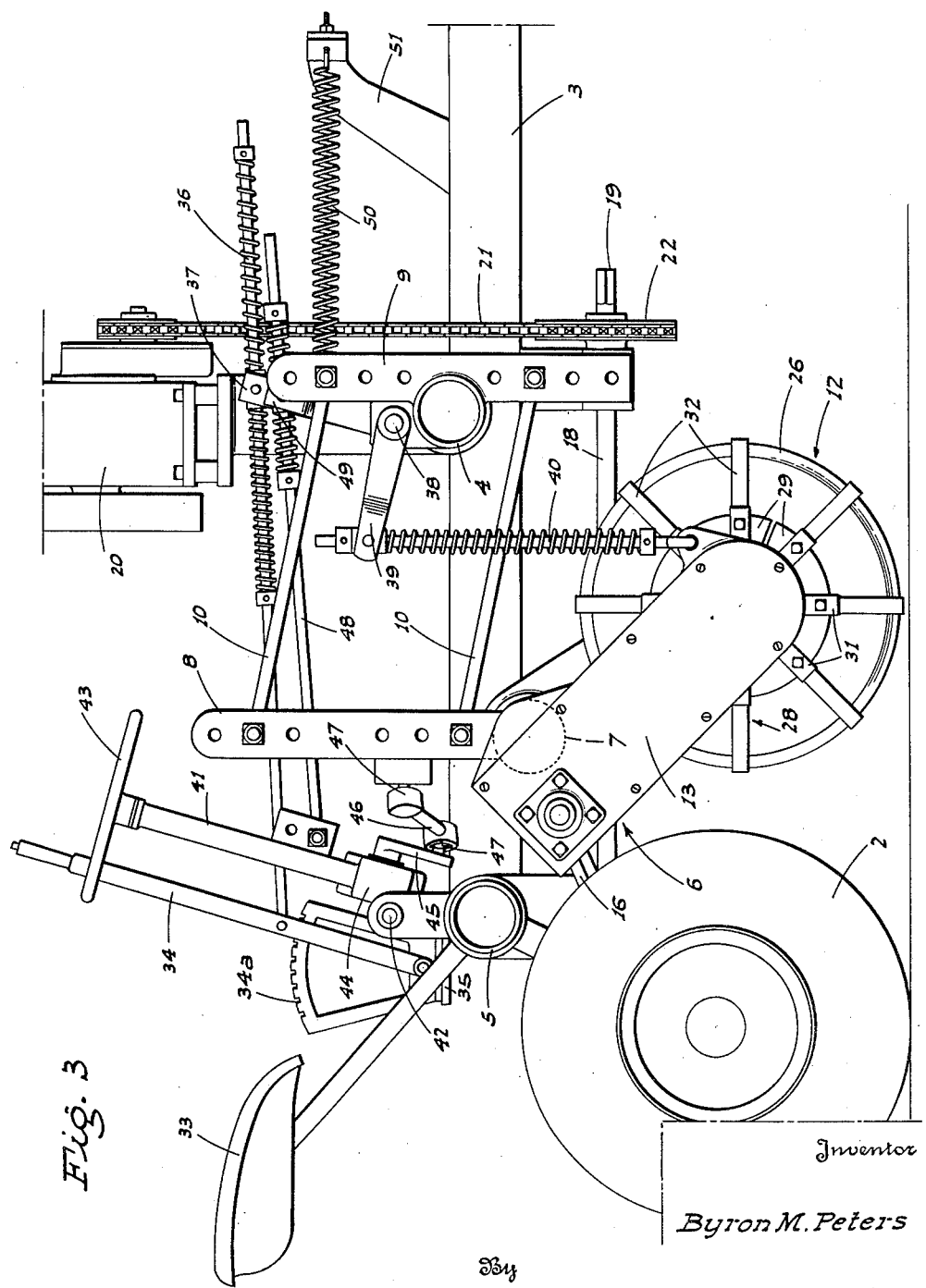

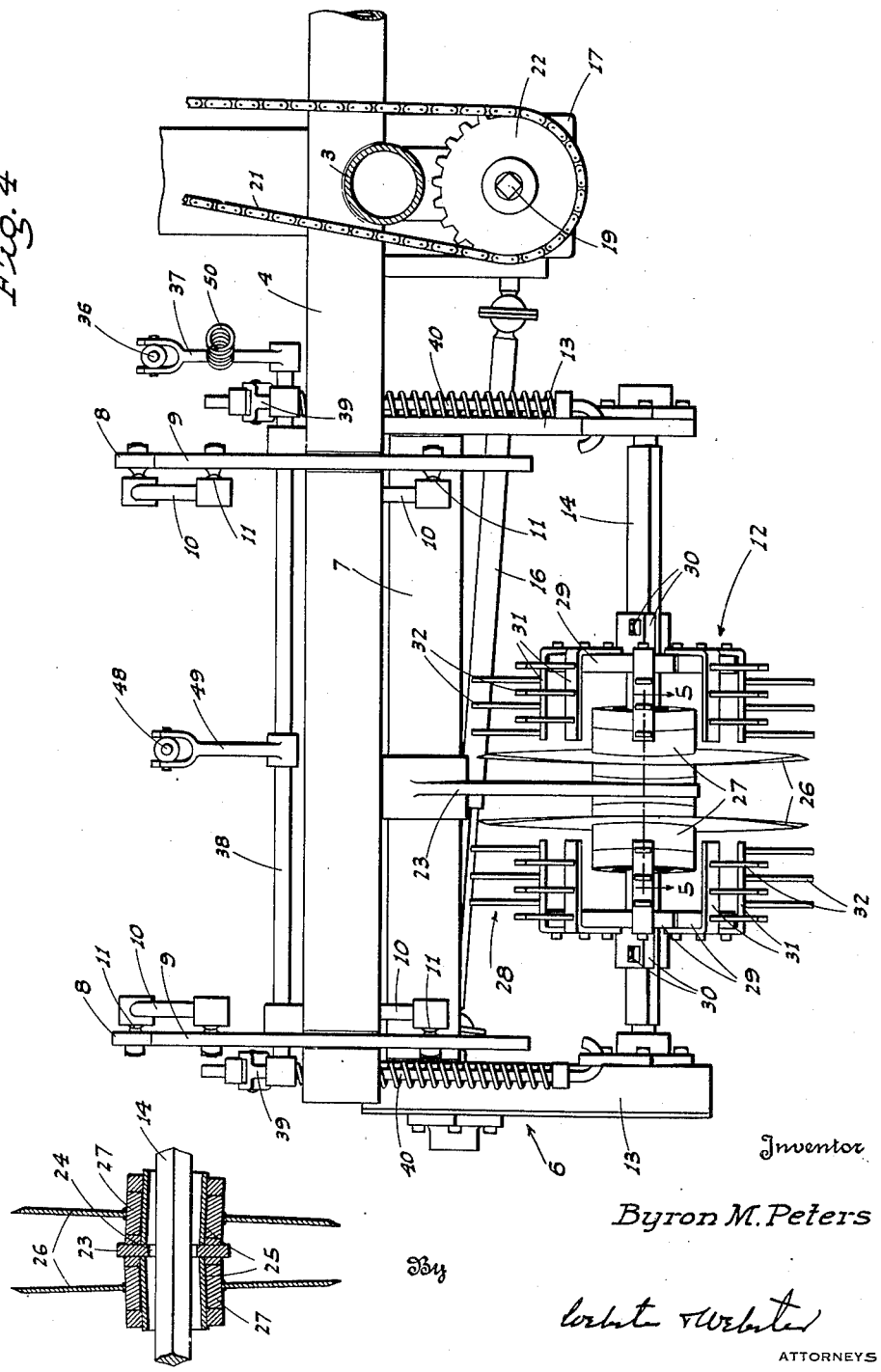

2,658,437

UNITED STATES PATENT OFFICE 2,658,437
CULTIVATING IMPLEMENT
Byron M. Peters, Lathrop, Calif.
Application July 25, 1949, Serial No. 106,699
4 Claims. (Cl. 97—40)

The present invention relates to an improved, power driven cultivating implement.

One object of this invention is to provide an implement especially designed, but not limited, for use to move along crop rows and cultivate the ground on opposite sides thereof.

Another object of the invention is to provide a cultivating implement which includes a cultivating unit, of novel construction and function, adapted to work along each crop row which the implement is intended to span; the present implement being two-row type and thus embodying two of said cultivating units.

A further object of the invention is to provide a cultivating implement, as in the preceding paragraph, wherein each cultivating unit is mounted for vertical and lateral adjustment, selectively and independently, at the will of an operator; there being novel adjustment control mechanism included in each cultivating unit whereby the operator may position such unit properly with respect to the crop on the row being worked.

An additional object of the invention is to provide a cultivating implement in which each cultivating unit includes a novel, power driven rotary cultivator for digging, weeding, and mulching along the sides of a crop row; there being transversely spaced discs which run on opposite sides of the plants, protecting the same from driven spinners which are disposed adjacent but laterally out from each disc.

It is also an object of the invention to provide a cultivating implement, of the type described, which is designed for reliable and convenient operation; the implement functioning relatively fast and effectively to cultivate along opposite sides of crop rows.

A further object of the invention is to provide a practical cultivating implement, and one which will be exceedingly effective for the purpose for which it is designed.

These objects are accomplished by means of such structure and relative arrangement of parts as will fully appear by a perusal of the following specification and claims.

In the drawings:

Fig. 1 is a diagrammatic top plan of the implement, with the rotary cultivators and drive mechanism therefor omitted for clarity.

Fig. 2 is a diagrammatic plan view showing particularly the drive mechanism for the two cultivating units.

Fig. 3 is an enlarged side elevation of the implement.

Fig. 4 is a front elevation of one of the cultivating units.

Fig. 5 is a fragmentary sectional plan of a blade unit, taken on line 5—5 of Fig. 4.

Referring now more particularly to the characters of reference on the drawings, the implement comprises a rigid, transversely elongated main frame, indicated generally at 1, which main frame, in the present embodiment, is supported, at the rear and adjacent the ends, by wheels 2. Centrally of its ends the frame includes a fixed, forwardly projecting draft tongue 3 for coupling to a tractor. While the implement is here shown as being wheel-supported and of a type adapted for draft connection to a tractor, it is understood that such implement may be direct-mounted on a tractor at any convenient point.

The main frame 1 includes a front cross beam 4 and a rear cross beam 5; there being a pair of transversely spaced cultivating units, each indicated generally at 6, disposed between said front cross beam 4 and rear cross beam 5 on opposite sides of the draft tongue 3.

As both of said cultivating units 6 are of identical construction, a description of one will suffice for both.

Each cultivating unit 6 comprises a transverse mounting beam 7 disposed parallel to the rear cross beam 5 adjacent but ahead of the latter; such transverse mounting beam 7 being supported for vertical and lateral adjustment as follows:

Transversely spaced rear posts 8 are fixed on, and upstand from, the mounting beam 7 adjacent its ends, while transversely spaced front posts 9 are fixed on and upstand from the front cross beam 4 in generally longitudinal alinement with corresponding rear posts 8.

Corresponding rear and front posts 8 and 9 are connected together by vertically spaced parallel links 10; the connection between such posts and links being ball and socket units 11, or other suitable universal connections. As shown in Fig. 3, the ball and socket units 11 are vertically adjustably connected to the respective posts.

Each transverse mounting beam 7 supports, ahead and generally below the same, a rotary cultivator, indicated generally at 12, which is constructed and mounted as follows:

At opposite ends thereof the transverse mounting beam 7 is fitted with rigid, forwardly and downwardly projecting end arms 13, the outer one of which is in the form of a housing, whose purpose will later appear.

A cross shaft 14, which is rectangular or non-circular intermediate its ends, extends between, and is journaled in connection with, the forward or free ends of the arms 13. Such cross shaft 14 is driven, from its outer end, by an endless chain and sprocket unit 15 enclosed within the outer arm 13 which is in the form of a housing, as previously indicated. In turn, the endless chain and sprocket unit 15 is driven by a universal drive shaft 16 from a gear box 17 on the rear of the main frame 1 centrally of its ends; such gear box 17 being actuated from a longitudinal, forwardly projecting shaft 18. This shaft 18 is formed, at its forward end, as at 19, for coupling to a power take-off shaft (not shown) extending from the tractor. Alternatively, the shaft 18 may be driven, as shown in Fig. 3, from an engine 20 through the medium of an endless chain and sprocket unit 21 whose lower sprocket is shown in Fig. 2 at 22.

A rigid central arm 23 is fixed on the transverse mounting beam 7 intermediate its ends and projects forwardly and downwardly generally parallel to the arms 13; the arm 23 having an opening 24 in its forward end through which the cross shaft 14 extends in free turning relation.

At its forward end, and on opposite sides thereof, the central arm 23 is fitted with laterally oppositely projecting bearing sleeves 25, and each sleeve is surrounded by a disc 26 having a hub 27 turnable on the corresponding sleeve 25 but secured thereon against axial displacement. With this arrangement the discs 26 are free turning and have no drive imparted thereto from the cross shaft 14. The bearing sleeves 25 are canted forwardly slightly so that the discs 26 toe in somewhat at the front.

Laterally of each disc 26 the cross shaft 14 is fitted with a spinner, indicated generally at 28; each such spinner comprising a split, circular mounting plate 29 having a split hub 30 clamped to the cross shaft 14. A plurality of L-shaped attachment fingers 31 are secured to each mounting plate 29 and have portions which overhang the adjacent hub 27; such overhanging portions of the attachment fingers 31 being fitted with outwardly projecting or radiating cultivator teeth or blades 32. With this arrangement the cultivator teeth or blades 32 travel in a circumferential path closely adjacent, though laterally outward of, the corresponding disc 26. The discs 26 are preferably of flat or coulter type.

Each cultivating unit 6, including the parallel link-supported, transverse mounting beam 7, and described rotary cultivator 12, is vertically and laterally adjustable, selectively and independently at the will of the operator by means of the following described mechanism:

An operator's seat 33 is mounted in connection with the rear cross beam 5 rearwardly of the same and generally centrally of the corresponding cultivating unit 6.

An upstanding hand lever 34 is pivoted in connection with, and upstands from, a platform 35 on the rear cross beam 5 adjacent, but laterally inwardly of, the operator's seat 33. The hand lever 34 is normally but releasably maintained in a set position by means including a notched quadrant 34a.

A spring balanced control rod 36 pivotally connects between the hand lever 34, and an upstanding radial lever arm 37 on a cross shaft 38 journaled atop the front cross beam 4.

Transversely spaced radial lever arms 39 project rearwardly from the cross shaft 38, and spring-loaded push rods 40 pivotally connect between the rear ends of the radial lever arms 39 and the forward ends of the arms 13. There is sufficient loose play in this arrangement to permit of lateral adjustment of the assembly including the transverse mounting beam 7, arms 13, and rotary cultivator 12 carried therebetween.

By adjusting the hand lever 34 the related cultivating unit 6 may be shifted between a raised transport position and a lowered working position. When in its lowered working position vertical, as well as lateral, adjustment is accomplished, independently of the setting of the hand lever 34, as follows:

A steering column 41 upstands ahead of the operator's seat 33, but within reach thereof; such steering column 41 being pivoted, as at 42, to the rear cross beam 5 for swinging motion in a longitudinal vertical plane. At its upper end the steering column 41 includes a hand wheel 43 which actuates a gear box 44 on the lower end of the column, and in turn such box swings a transverse throw arm 45 mounted exteriorly of said box. A link 46 is pivotally connected between the throw arm 45 and one of the rear posts 8 by ball and socket units 47, or other suitable universal connections. Thus, by turning the hand wheel 43, the operator accomplishes transverse throw of the arm 45 and lateral adjustment of the link 46 and connected cultivating unit 6.

A spring balanced control rod 48 pivotally connects between the steering column 41 intermediate its ends and a radial lever arm 49 which upstands from the cross shaft 38 substantially centrally between the radial lever arms 37.

By swinging the steering column 41 forwardly or rearwardly, up or down adjustment of the cultivating unit 6, including the rotary cultivator 12, is accomplished.

By employing spring balanced control rods 36 and 48, and a spring loaded push rod 40, each cultivating unit 6 is free to float as it travels along a crop row in the manner hereinafter described. Such floating is enhanced by a counterbalancing spring 50 which connects between one radial lever arm 37 and a post 51 which upstands from the draft tongue 3.

The above described cultivating implement functions as follows:

The implement travels along crop rows in spanning relation thereto, and with each cultivating unit 6 running directly above a corresponding row.

Each cultivator 12 is lowered by the lever 34 to working position and then the operator manipulates the corresponding steering column 41 to adjust the cultivator 12 vertically and laterally so as to maintain the crop row running between the discs 26. These discs 26 sever weeds, vines, or the like closely on opposite sides of the plants, and additionally serve as protective members against damage to the plants, which might otherwise result from the relatively rapidly turning spinners 28 laterally outwardly of said discs. As the spinners 28 rotate they effectively cultivate, weed, and mulch the crop row along opposite sides thereof.

As each operator has a good view of the related cultivating unit 6, and as he can adjust the latter both vertically and laterally, selectively and independently, each rotary cultivator 12 is effectively maintained in its proper path of travel and at the most desirable elevation for cultivating on opposite sides of the crop row.

The described implement is very practical for the intended purpose, and accomplishes cultivation along crop rows in a rapid manner, but without injury to the crop or plants on said row. As the discs 26 penetrate or run some distance in the ground, they effectively shield the root zones of the plants from possible damage by the spinners.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A cultivating implement comprising a frame supported above the ground for travel along a crop row, a transverse mounting beam, a pair of transversely spaced posts fixed on said mounting beam, another pair of transversely spaced posts fixed on the main frame is generally longitudinally alined relation to corresponding ones of said first named pair of posts, vertically spaced parallel links extending between said corresponding posts, universal connections securing the links at the ends to adjacent posts, rigid, transversely spaced arms projecting longitudinally at a downward incline from the mounting beam, a driven cross shaft journaled on and extending between said arms adjacent their free ends, rotary cultivating means on the cross shaft, and operator-controlled mechanism operative to effect vertical and lateral adjustment, selectively and independently, of the unitary assembly of said mounting beam, arms, cross shaft, and rotary cultivating means; said operator-controlled mechanism including a longitudinally movable member and means connecting said member with said unitary assembly in a manner to effect vertical adjustment thereof upon longitudinal movement of said member, a laterally movable member and means connecting said last named member with said unitary assembly in a manner to effect lateral adjustment thereof upon lateral movement of the last named member, and a manually actuated, common control device mounted on the frame and to which said members are both connected, operative to reversibly move said first named member longitudinally and to reversibly move said last named member laterally; said control device comprising an upstanding steering column having a hand wheel on its upper end, means pivoting said column at its lower end on the frame for swinging movement lengthwise of the implement, the first named member being connected to the column above its pivot, and a wheel-actuated transverse throw arm on the column to which the laterally movable member is connected.

2. A cultivating implement comprising a frame supported above the ground for travel along a crop row, a transverse mounting beam, a pair of transversely spaced posts fixed on said mounting beam, another pair of transversely spaced posts fixed on the main frame in generally longitudinally alined relation to corresponding ones of said first named pair of posts, vertically spaced parallel links extending between said corresponding posts, universal connections securing the links at the ends to adjacent posts, a driven cross shaft supported by a pair of transversely spaced downwardly and longitudinally inclined arms from said mounting beam, rotary cultivating means on the cross shaft, a longitudinally movable control rod, rod actuated connections with the unitary assembly of said beam, shaft, and cultivating means operative to vertically adjust said assembly, a laterally movable control link operative to laterally adjust said unitary assembly, and a common manually actuated control device, to which said rod and link connect, operative to reversibly move the same selectively and independently.

3. A cultivating implement comprising a frame supported above the ground for travel along a crop row, a transverse mounting beam, a pair of transversely spaced posts fixed on said mounting beam, another pair of transversely spaced posts fixed on the main frame in generally longitudinally alined relation to corresponding ones of said first named pair of posts, vertically spaced parallel links extending between said corresponding posts, universal connections securing the links at the ends to adjacent posts, rigid, tranversely spaced arms projecting longitudinally at a downward incline from the mounting beam, a driven cross shaft journaled on and extending between said arms adjacent their free end, a rotary cultivating means on the cross shaft, an upstanding steering column on the main frame rearwardly of the unitary assembly of said beam, arms, cross shaft and cultivating means, means mounting the steering column for swinging in a longitudinal vertical plane, a wheel on said column, a wheel actuated transverse throw arm on the column, connections between said column and unitary assembly operative to vertically adjust the latter upon longitudinal swinging of said column, and other connections between the throw arm and said unitary assembly operative to laterally adjust the same upon transverse swinging of said throw arm.

4. A cultivating implement comprising a frame supported above the ground for travel along a crop row, the frame including a cross beam, a separate transverse mounting beam spaced to the rear of the cross beam, a pair of transversely spaced posts on each of the beams, corresponding posts of the pairs being generally alined longitudinally of the implement, vertically spaced parallel linkage extending between said corresponding posts, universal connections between the ends of the links and adjacent posts, a pair of arms rigid with and projecting at a forward and downward incline from the mounting beam, a driven cross shaft journaled on and extending between the lower ends of the arms, rotary cultivating means on the cross shaft, a separate cross shaft journaled on the cross beam of the main frame, a rearwardly projecting lever arm on said separate cross shaft, a spring-loaded push rod connected between said lever arm and one of the arms on the mounting beam, an upstanding radial lever arm on said separate cross shaft, a longitudinally movable spring balanced control rod connected to said upstanding lever arm, a laterally movable control link connected to the unitary assembly of said mounting beam and arms thereon, and a common manual control device connected to said control rod and control link to move the same selectively and independently.

BYRON M. PETERS.

References Cited in the file of this patent

UNITED STATES PATENTS

| Number | Name | Date |
|---|---|---|
| 41,550 | Thomson | Feb. 9, 1864 |
| 429,668 | Whitman | June 10, 1890 |
| 651,707 | Forsberg | June 12, 1900 |
| 780,218 | McCloskey | Jan. 17, 1905 |
| 973,677 | Lynch | Oct. 25, 1910 |
| 1,286,585 | Gentry | Dec. 3, 1918 |
| 1,291,772 | Currier | Jan. 21, 1919 |
| 1,682,468 | Barnes | Aug. 28, 1928 |
| 1,897,885 | Borocki | Feb. 14, 1933 |
| 2,364,043 | Ariens | Dec. 5, 1944 |
| 2,366,386 | Clark | Jan. 2, 1945 |
| 2,438,189 | Seaman | Mar. 23, 1948 |